(12) United States Patent
Allwin

(10) Patent No.: US 7,384,098 B1
(45) Date of Patent: Jun. 10, 2008

(54) INFANT MUMMY BAG FOR USE WITH A CAR SEAT

(76) Inventor: Gloria A. Allwin, 185 Golf Course Rd., Laurel, MT (US) 59044

( * ) Notice: Subject to any disclaimer, the term of this patent is extended or adjusted under 35 U.S.C. 154(b) by 0 days.

(21) Appl. No.: 11/636,386

(22) Filed: Dec. 8, 2006

Related U.S. Application Data

(60) Provisional application No. 60/748,671, filed on Dec. 8, 2005.

(51) Int. Cl.
A47C 31/11 (2006.01)
(52) U.S. Cl. .................................. 297/219.12
(58) Field of Classification Search ............ 297/219.12
See application file for complete search history.

(56) References Cited

U.S. PATENT DOCUMENTS

| 4,802,244 | A |   | 2/1989  | McGrath-Saleh |            |
|-----------|---|---|---------|---------------|------------|
| 4,882,213 | A |   | 11/1989 | Graddis et al.|            |
| 4,892,769 | A |   | 1/1990  | Perdelwitz, Jr. et al. |   |
| 5,243,724 | A |   | 9/1993  | Barnes        |            |
| 5,309,586 | A | * | 5/1994  | Sies et al.   | 297/219.12 X |
| 5,333,769 | A |   | 8/1994  | Skroski       |            |
| 5,437,061 | A |   | 8/1995  | Kenner        |            |
| 5,897,164 | A | * | 4/1999  | Kagan et al.  | 297/219.12 |
| 5,950,261 | A | * | 9/1999  | Hay et al.    | 297/219.12 X |
| 5,988,742 | A |   | 11/1999 | Stevens       |            |
| 6,055,686 | A |   | 5/2000  | Knight        |            |
| 6,145,932 | A | * | 11/2000 | Hamel-Nyhus et al. | 297/219.12 X |
| 6,175,976 | B1|   | 1/2001  | Cantwell      |            |
| 6,243,892 | B1|   | 6/2001  | Kelling       |            |
| 6,394,543 | B1| * | 5/2002  | Dunne et al.  | 297/219.12 |
| 6,547,325 | B2| * | 4/2003  | Drost et al.  | 297/219.12 X |
| 6,640,340 | B2|   | 11/2003 | Gibson        |            |
| 6,702,381 | B2| * | 3/2004  | Endicott et al.| 297/219.12 X |
| 6,764,134 | B1| * | 7/2004  | Crescenzi et al.| 297/219.12 |
| 6,817,033 | B2|   | 11/2004 | Bailey        |            |
| 2003/0079270 | A1 |   | 5/2003 | Bailey       |            |
| 2004/0217633 | A1 | * | 11/2004 | Kassai et al. | 297/219.12 |
| 2005/0045674 | A1 |   | 3/2005 | Rehbein       |            |
| 2005/0177921 | A1 |   | 8/2005 | Rodriguez et al. |        |
| 2005/0200174 | A1 | * | 9/2005 | Morgan et al. | 297/219.12 |
| 2006/0001299 | A1 | * | 1/2006 | Sallus        | 297/219.12 |
| 2006/0006710 | A1 | * | 1/2006 | Sallus        | 297/219.12 |

FOREIGN PATENT DOCUMENTS

FR 002650487 A1 2/1991

* cited by examiner

Primary Examiner—Rodney B. White
(74) Attorney, Agent, or Firm—Richard C. Conover

(57) ABSTRACT

The mummy bag including a blanket having an integral hood with a face opening and two opposing side edges. A zipper is provided for connecting the side edges together leaving an open bottom. Draw strings are provided for reducing the size of the face opening and the open bottom. The mummy back includes an opening on the back of the mummy bag for receiving an infant carrier harness latch. The blanket further includes a large opening on the back of the mummy bag sized to conform to the back of the infant within the mummy bag for freely receiving harness straps mounted to the carrier.

4 Claims, 6 Drawing Sheets under the present invention with a five point harness.
INFANT MUMMY BAG FOR USE WITH A CAR SEAT This application claims the benefit of provisional application Ser. No. 60/748,671 filed Dec. 8, 2005.

BACKGROUND OF INVENTION

The present invention relates to an infant mummy bag which is constructed to allow an infant to be enclosed by the mummy bag and at the same time fitted into a car seat so that the infant is securely harnessed to the car seat.

The general concept of providing a covering for an infant positioned in an infant carrier is known such as shown in U.S. Pat. No. 6,055,686 to Knight. Another textile article adapted to serve as a cover for a child in a car safety seat is shown in French Publication No. FR002650487 A1.

The present invention is an improvement over the known covers for infants harnessed into a car seat because the present invention can be used with both a three-point harness and a five-point harness. The present invention allows an infant to be covered by a mummy bag while harnessed in a car seat and allows the infant to be removed from the car seat by simply releasing the harness. The mummy bag does not have to be removed prior to removing the infant from the car seat. The present invention is convenient to use and is easily adaptable for use with the many different car seats on the market today.

SUMMARY OF INVENTION

The present invention is directed to a mummy bag for covering an infant. The mummy bag is designed to allow the infant within the mummy bag to be safely installed in an infant carrier seat having harness straps and a harness latch without the necessity of first removing the mummy bag. The mummy bag according to the present invention includes a blanket having an integral hood with a face opening and two opposing side edges. A zipper is provided for connecting the side edges together leaving an open bottom. Draw strings are provided for reducing the size of the face opening and the open bottom. The mummy back includes an opening on the back of the mummy bag for receiving a harness latch. The blanket further includes a large opening on the back of the mummy bag sized to conform to the back of the infant within the mummy bag for freely receiving the harness straps mounted to the carrier.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
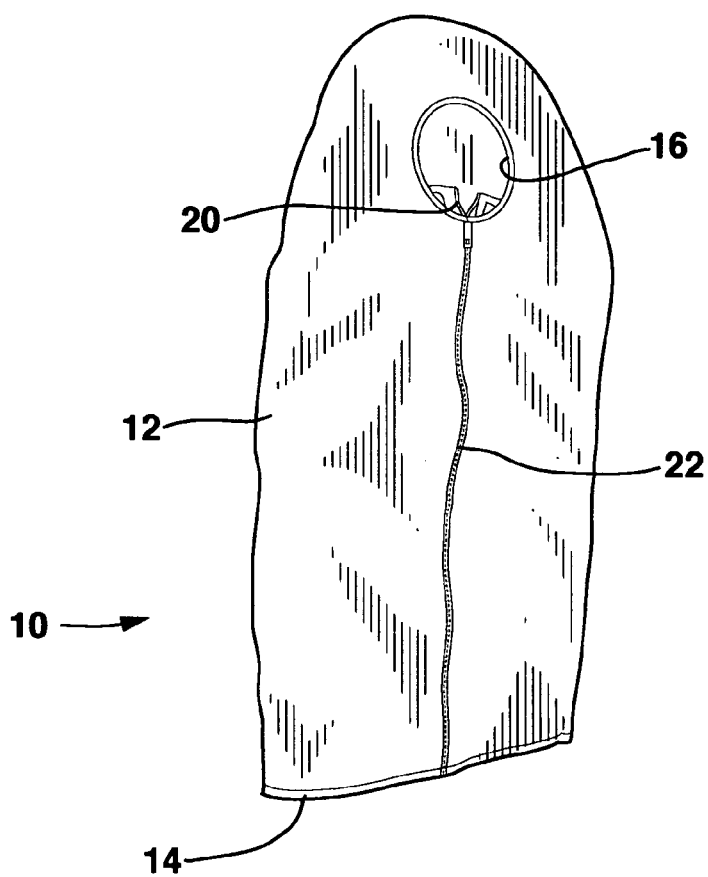
FIG. 1 is a front perspective view of a mummy bag constructed according to the present invention.
Figure 2:
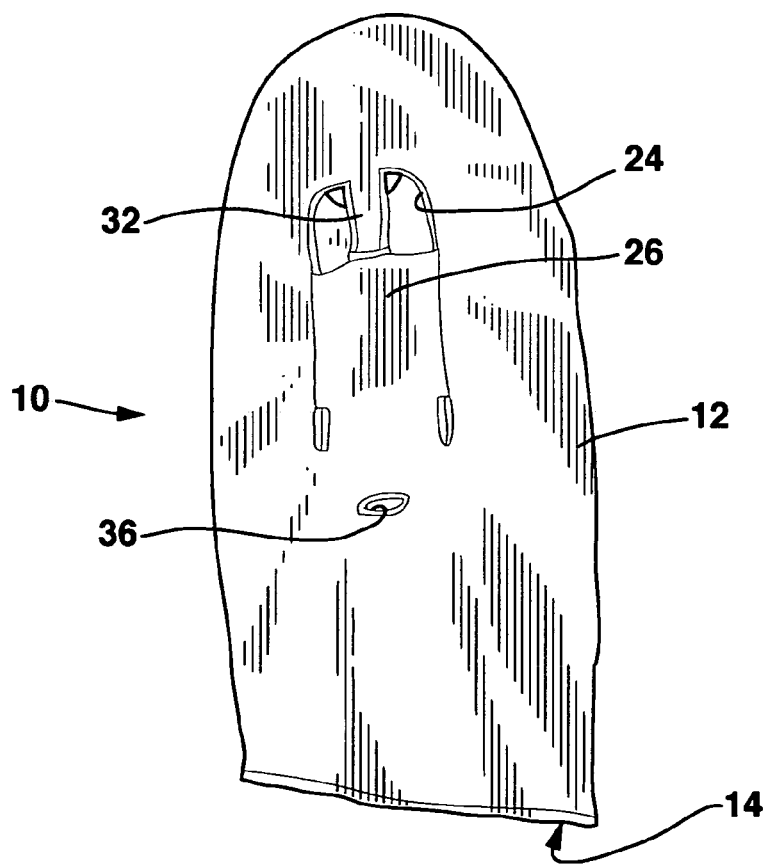
FIG. 2 is a rear perspective view of the invention shown in FIG. 1.

A infant mummy bag 10 according to the present invention is shown in FIGS. 1 and 2. The mummy bag 10 includes a hooded blanket 12 having an open bottom 14 and a face opening 16. In a preferred embodiment, the blanket 12 may be constructed of either a flannel or fleece material. The open bottom 14 includes a drawstring 18 secured around the periphery of the opening 14 for closing the opening 14 when the drawstring 18 is pulled. Similarly, a drawstring 20 is provided around the periphery of the face opening 16 and allows the face opening 16 to be reduced in size to conform to the face of an infant placed in the mummy bag 10.

The front of the mummy bag 10 is provided with a zipper 22 extending from the open bottom 14 to the face opening 16.

Figure 3:
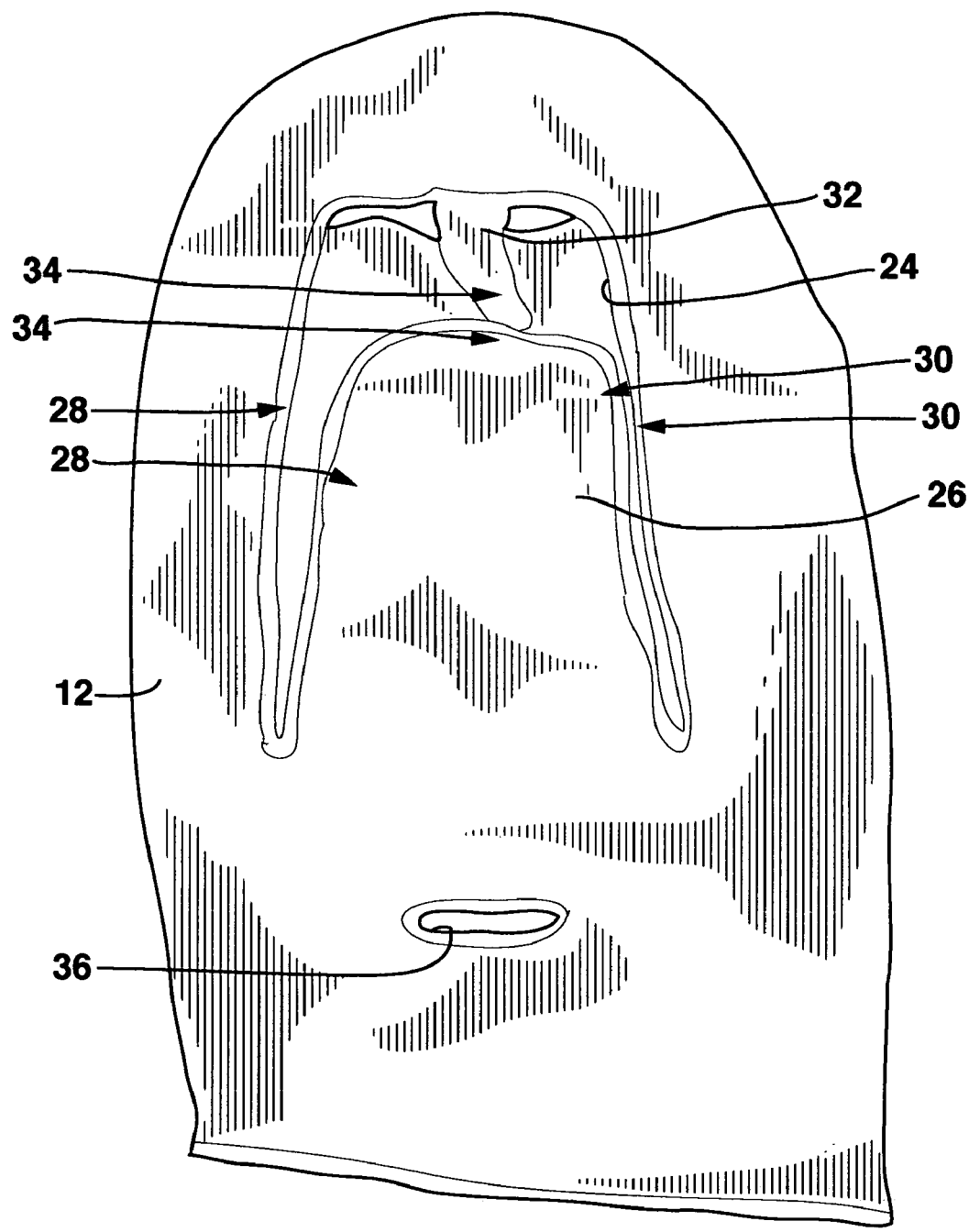
FIG. 3 is a detailed view of a portion of the rear side of the present invention.
Figure 4:
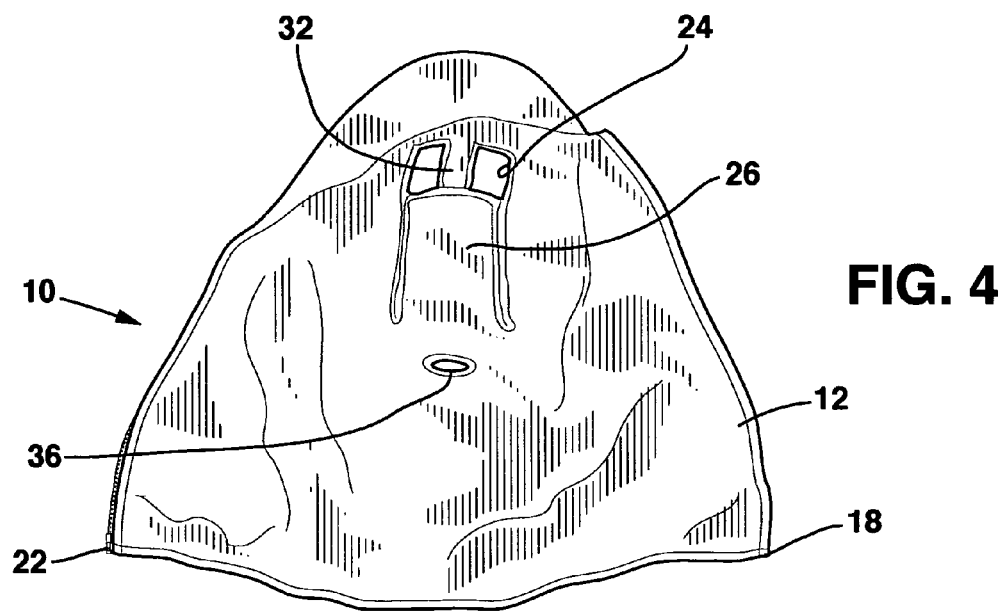
FIG. 4 is a front perspective view of the invention shown in FIG. 1 with a zipper shown in the opened position.

The reverse side of the mummy bag 10 is shown in FIG. 2. An opening 24 is provided in the back of the blanket 12. The opening 24 is partially closed with a flap 26 as shown in FIGS. 2 and 3. A Velcro fastener 28 is used to secure the flap 26 to the blanket 12 along one edge of the flap 26. A second Velcro fastener 30 is used to secure the opposite side of the flap 26 to the blanket 12. Further, the blanket 12 is provided with a tongue 32. The tongue 32 is provided with a Velcro fastener 34 for securing the tongue 34 to the flap 26. Further the blanket 12 is provided with an opening 36 as shown in FIG. 3.

Figure 5:
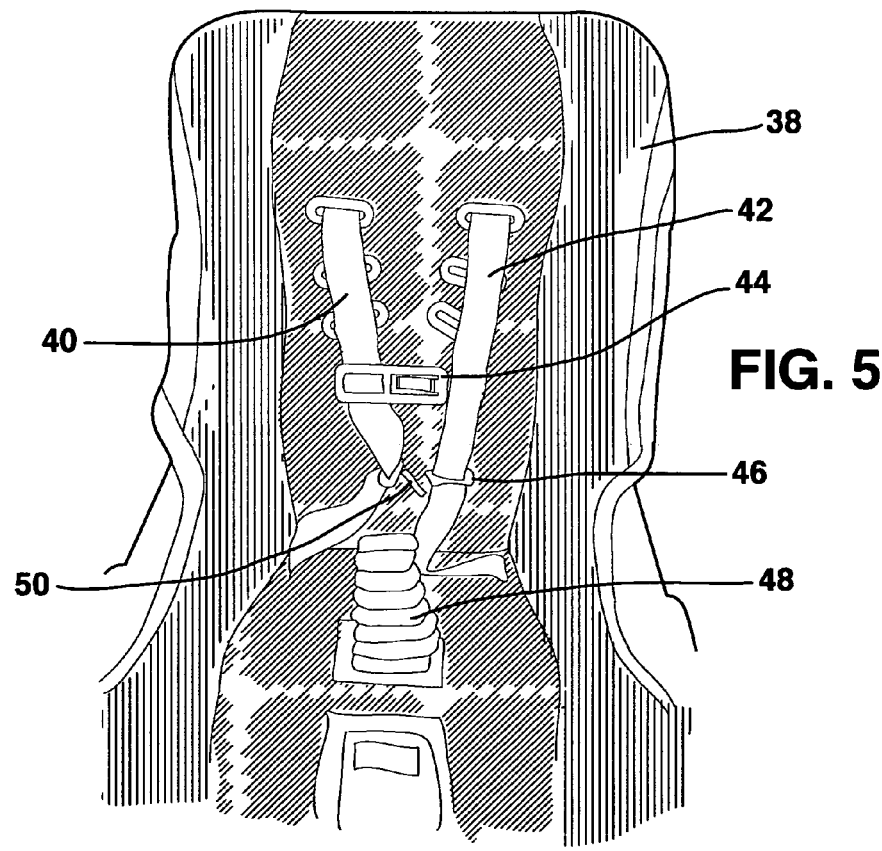
FIG. 5 is a perspective view of a conventional infant car seat provided with a five point harness.

The mummy bag 10 according to the present invention may be conveniently used with an infant car seat having a five point harness as shown in FIG. 5. The car seat 38 is provided with a pair of straps 40 and 42 which have a top end mounted to the back portion of the car seat 38 and a lower end connected to the seat portion of the car seat 38. A breast clip 44 is provided for securing the straps 40 and 42 across the breast of the infant secured in the car seat. A strap guide 46 is provided to direct the straps 40 and 42 toward the stomach portion of the infant resting in the car seat and then directing the straps upwardly toward the breast clip 44. Finally, the car seat 38 is provided with a harness latch 48 for receiving the harness buckle 50 to secure the straps 40 and 42 at the front of the infant sitting in the car seat and securing the infant to the car seat.

Figure 6:
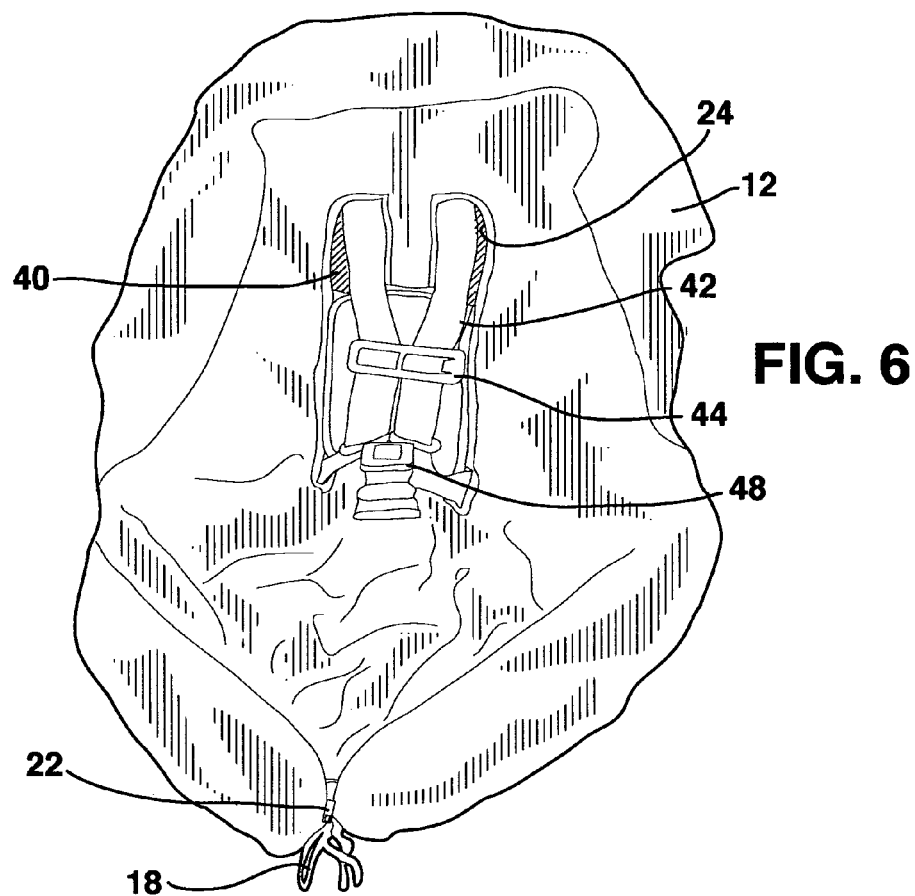
FIG. 6 is a front perspective view of the invention shown in FIG. 4 with the harness straps of the car seat shown in FIG. 5 extending through the mummy bag in accordance with the present invention.
Figure 7:
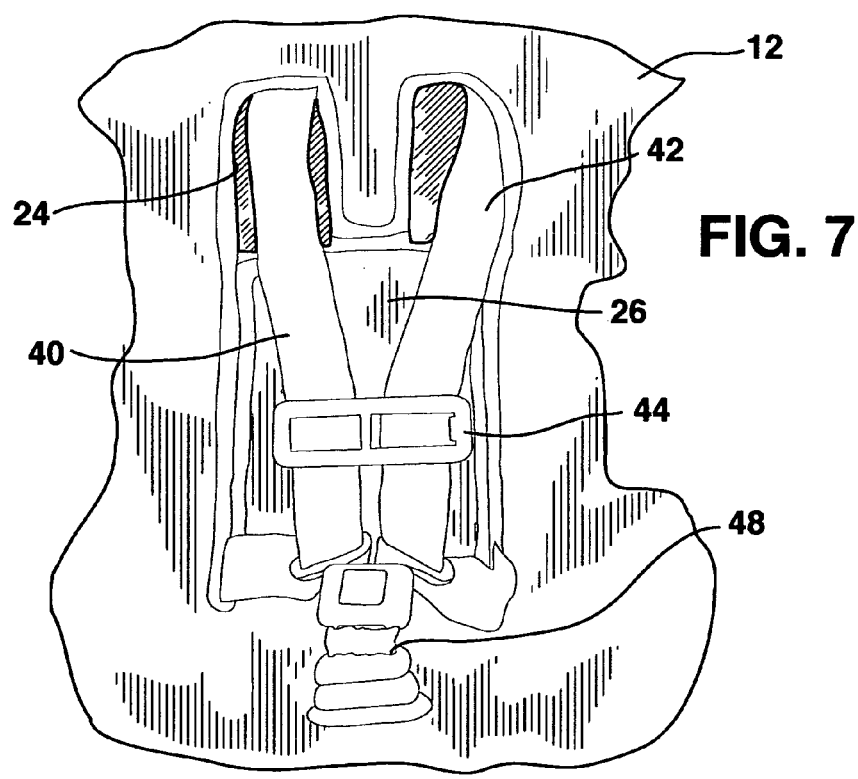
FIG. 7 is a detailed view of the invention shown in FIG. 6.
Figure 10:
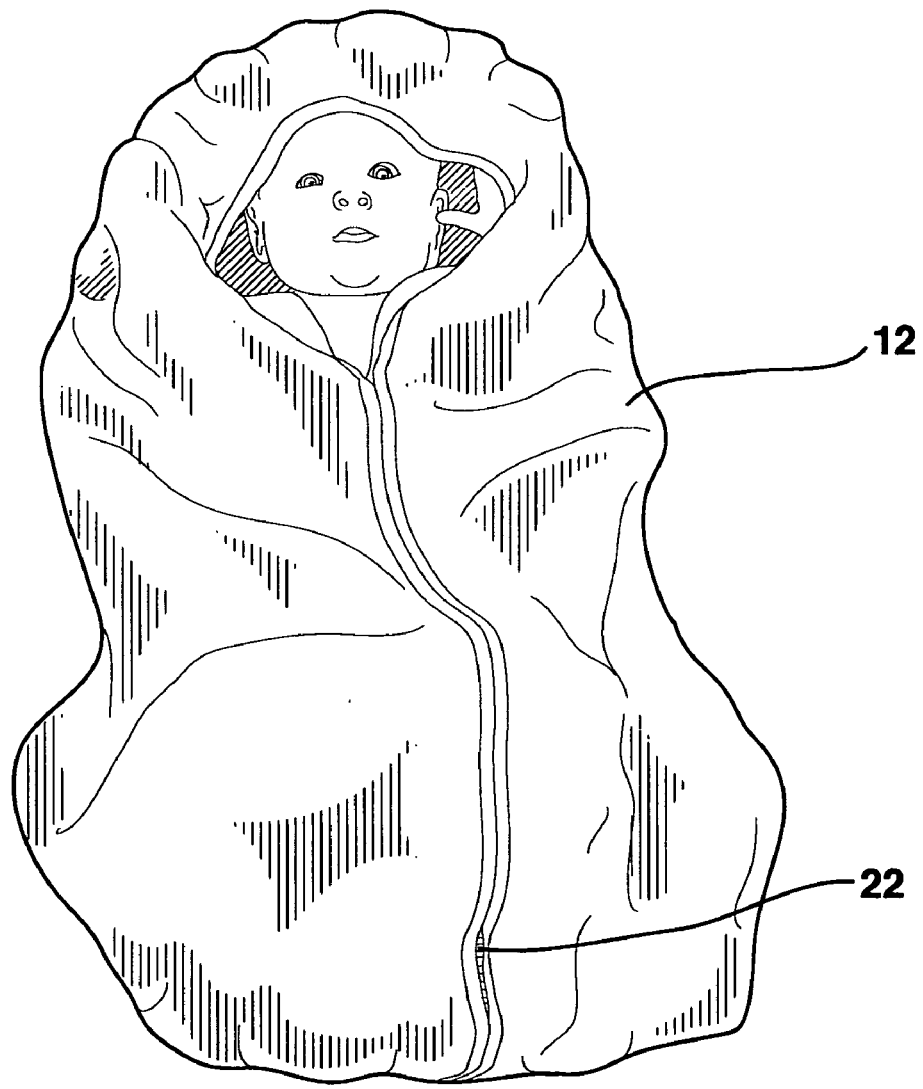
FIG. 10 is a front perspective view of an infant enclosed with a mummy bag according to the present invention.

FIGS. 6 and 7 show the mummy bag 10 according to the present invention fitted into the car seat. When using the present invention with a five point harness, straps 40 and 42 are first positioned to extend through the opening 24 as shown in FIG. 7 and the harness latch 48 positioned to extend through the opening 36. The infant is placed in the blanket 12 with the infant's arms extending underneath the straps 40 and 42. The straps are threaded through the strap guide 46 and the buckle 50 attached to the latch 48. The breast clip 44 is then fitted on the straps 40 and 42 across the breast of the infant. In this manner, the infant is secured to the car seat inside the blanket. Next, the zipper 22 may then be closed as shown in FIG. 10 to completely cover the infant resting in the car seat. The drawstring 18 and the drawstring 20 may be then be drawn out to close the face opening 16 and the open bottom 14 to a desired closure.

Figure 8:
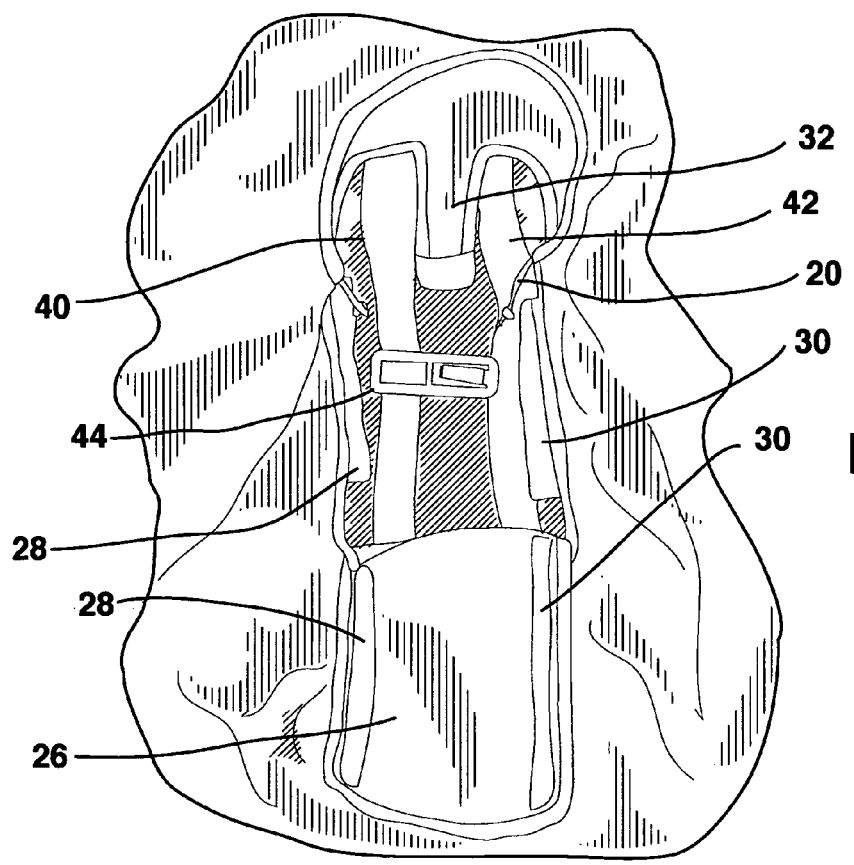
FIG. 8 is a rear perspective view of the mummy bag shown in FIG. 1 showing the use of the mummy bag according to the present invention with a three point harness.
Figure 9:
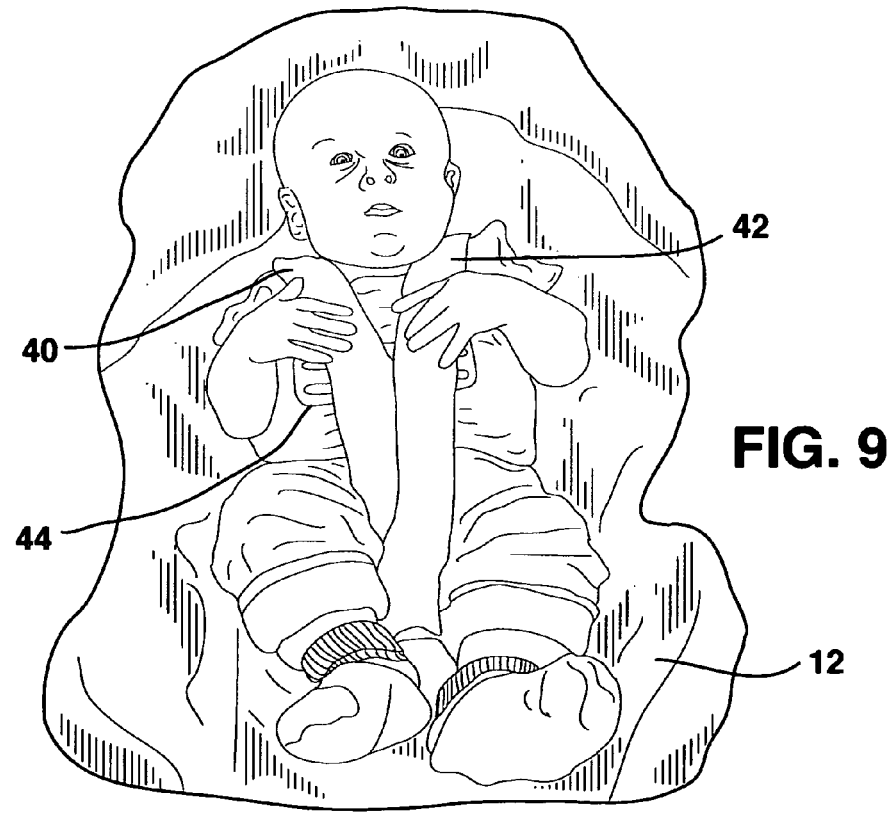
FIG. 9 is a front perspective view of the mummy bag according to the present invention used with a three point harness.

The mummy bag according to the present invention 10 may also be used with a three point harness as shown in FIGS. 8 and 9. As with the five point harness, the three point harness is provided with a pair of straps 40 and 42. The top of the straps 40 and 42 are secured to the back of the car seat 38 as shown in FIG. 5. The straps 40 and 42 at the bottom end thereof are secured together and connected to a buckle (not shown). The buckle is then extended through the opening 36 and connected with a latch (not shown) as is conventionally known in the art. The three point harness is provided with a breast clip 44 which holds the straps 40 and 42 across the breast of the infant resting in the car seat.

The invention 10 is used with the three point harness in the same manner as with the five point harness. With either the five point harness or the three point harness, the zipper 22 may be used to close the blanket 12 in a surrounding relationship with the infant resting in the car seat as shown in FIG. 10 and the drawstrings 18 and 20 can be drawn out to close their respective openings to a desired position.

Although, the invention is described above for use with a car seat, it is intended that the invention 10 may be used with strollers or other such equipment utilizing infant retaining harness straps.

While the fundamental novel features of the invention have been shown and described, it should be understood that various substitutions, modifications, and variations may be made by those skilled in the arts, without departing from the spirit or scope of the invention. Accordingly, all such modifications or variations are included in the scope of the invention as defined by the following claims:

I claim:

1. A mummy bag for use with an infant carrier having a back portion and a seat portion together with a three-point retaining harness including a pair of retaining straps, each strap having one end connected to the back portion of the carrier and the opposite end connected to a harness buckle and further including a harness latch connected to the seat portion of the carrier for receiving the harness buckle, the mummy bag comprising:
    a blanket having a contoured top edge forming an integral hood with a face opening, two opposing lengthwise side edges and a bottom edge;
    a closure means extending from the bottom edge to the face opening along the side edges for connecting together the side edges of the blanket leaving an open bottom;
    a drawstring secured around the periphery of the open bottom for closing the open bottom;
    a drawstring secured around the periphery of the face opening for reducing the size of the face opening;
    an opening in the blanket disposed near the bottom edge and generally centered between the two opposing side edges for receiving the harness latch;
    an enlarged opening in the blanket disposed near the top edge and generally centered between the two opposing side edges for freely receiving the pair of retaining straps;
    a flap for partially closing the enlarged opening, the flap hingedly connected to a bottom edge of the enlarged opening, the flap further including opposing side edges together with means for releasably securing the side edges to the blanket; and
    a tongue hingedly attached to the blanket at a top edge of the enlarged opening and depending toward the flap and means for securing a free end of the tongue to the flap, the tongue having a lateral width less than the lateral width of the enlarged opening wherein each harness strap may extend through the enlarged opening on either side of the tongue.

2. The mummy bag according to claim 1 wherein the closure means includes a zipper.

3. A mummy bag for use with an infant carrier having a back portion and a seat portion together with a five-point retainer harness including a pair of retaining straps each having one end connected to the back of the carrier and an opposite end connected to the seat of the carrier together with a harness latch connected to the seat of the carrier and a harness buckle slidably receiving the harness straps and releasably secured to the harness latch, the mummy bag comprising:
    a blanket having a contoured top edge forming an integral hood with a face opening and two opposing lengthwise side edges and a bottom edge;
    a closure means extending from the bottom edge to the face opening along the side edges for connecting together the side edges of the blanket leaving an open bottom;
    a drawstring secured around the periphery of the open bottom for closing the open bottom;
    a drawstring secured around the periphery of the face opening for reducing the size of the face opening;
    a first opening in the blanket disposed nearer the bottom edge and generally centered between the two opposing side edges for receiving the harness latch;
    an enlarged opening in the blanket generally centered between the opposing side edges and extending from a position adjacent to but spaced apart from the first opening to a position nearer the top edge of the blanket for freely receiving the pair of retaining straps;
    a flap for partially closing the enlarged opening, the flap hingedly connected to a bottom edge of the enlarged opening, the flap further including opposing side edges together with means for securing the opposite side edges to the blanket around the harness straps extending through the enlarged opening; and
    a tongue hingedly connected to the blanket at a top edge of the enlarged opening and depending toward the flap and means for securing a free end of the tongue to the flap, the tongue having a lateral width less than the lateral width of the enlarged opening wherein each harness strap may extend through the enlarged opening on either side of the tongue.

4. The mummy bag according to claim 3 wherein the closure means includes a zipper.

* * * * *